United States Patent

Coppier

[11] Patent Number: 5,129,313
[45] Date of Patent: Jul. 14, 1992

[54] COOKING APPLIANCE WITH HINGED PLATES

[75] Inventor: Michel Coppier, Rumilly, France
[73] Assignee: SEB S.A., Selongey, France
[21] Appl. No.: 714,749
[22] Filed: Jun. 13, 1991
[30] Foreign Application Priority Data

Jun. 20, 1990 [FR] France .................. 90 07710

[51] Int. Cl.⁵ .................. A47J 37/00; A47J 37/06; H05B 3/06
[52] U.S. Cl. .................. 99/376; 99/372; 99/377; 99/380; 219/524
[58] Field of Search .................. 99/339, 372, 376, 377, 99/378, 379, 385, 380, 389, 331, 422, 401, 425; 219/524, 525, 386, 472

[56] References Cited

U.S. PATENT DOCUMENTS

| | | |
|---|---|---|
| 2,795,182 | 6/1957 | Gomersall . |
| 3,068,778 | 12/1962 | Majerus .................. 99/380 |
| 3,172,999 | 3/1965 | Sutton et al. . |
| 3,348,470 | 10/1967 | Swanson .................. 99/376 |
| 3,696,734 | 10/1972 | Beasley et al. .................. 99/375 |
| 3,848,110 | 11/1974 | Giguere et al. . |
| 3,978,238 | 8/1976 | Frey et al. .................. 99/380 |
| 3,998,145 | 12/1976 | Maisch .................. 99/376 |
| 4,002,112 | 1/1977 | Snyder .................. 99/422 |
| 4,011,431 | 3/1977 | Levin .................. 219/524 |
| 4,091,720 | 5/1978 | Wheeler .................. 219/524 |
| 4,150,609 | 4/1979 | McClean .................. 99/372 |
| 4,178,500 | 12/1979 | Brindopke .................. 219/524 |
| 4,206,345 | 6/1980 | Maas et al. .................. 99/374 |

FOREIGN PATENT DOCUMENTS

| | | |
|---|---|---|
| 2409875 | 9/1975 | Fed. Rep. of Germany .................. 99/372 |
| 2302067 | 9/1976 | France . |
| 321814 | 7/1957 | Switzerland . |
| 809858 | 3/1959 | United Kingdom . |

Primary Examiner—Timothy F. Simone
Attorney, Agent, or Firm—Young & Thompson

[57] ABSTRACT

An electric appliance for cooking and especially toasting food products such as ham-and-cheese sandwiches has two cooking plates (1, 2) which are hinged together. Each cooking plate is formed of die-stamped sheet metal and attached to a sheet-metal support plate (15, 16) forming a reflector, an electric heating resistor (13) being placed between the support plate and the cooking plate. The support plates (15, 16) are provided on one side with elements (3, 4) for joining them together in hinged relation and on the opposite side with elements for attaching handles.

7 Claims, 3 Drawing Sheets

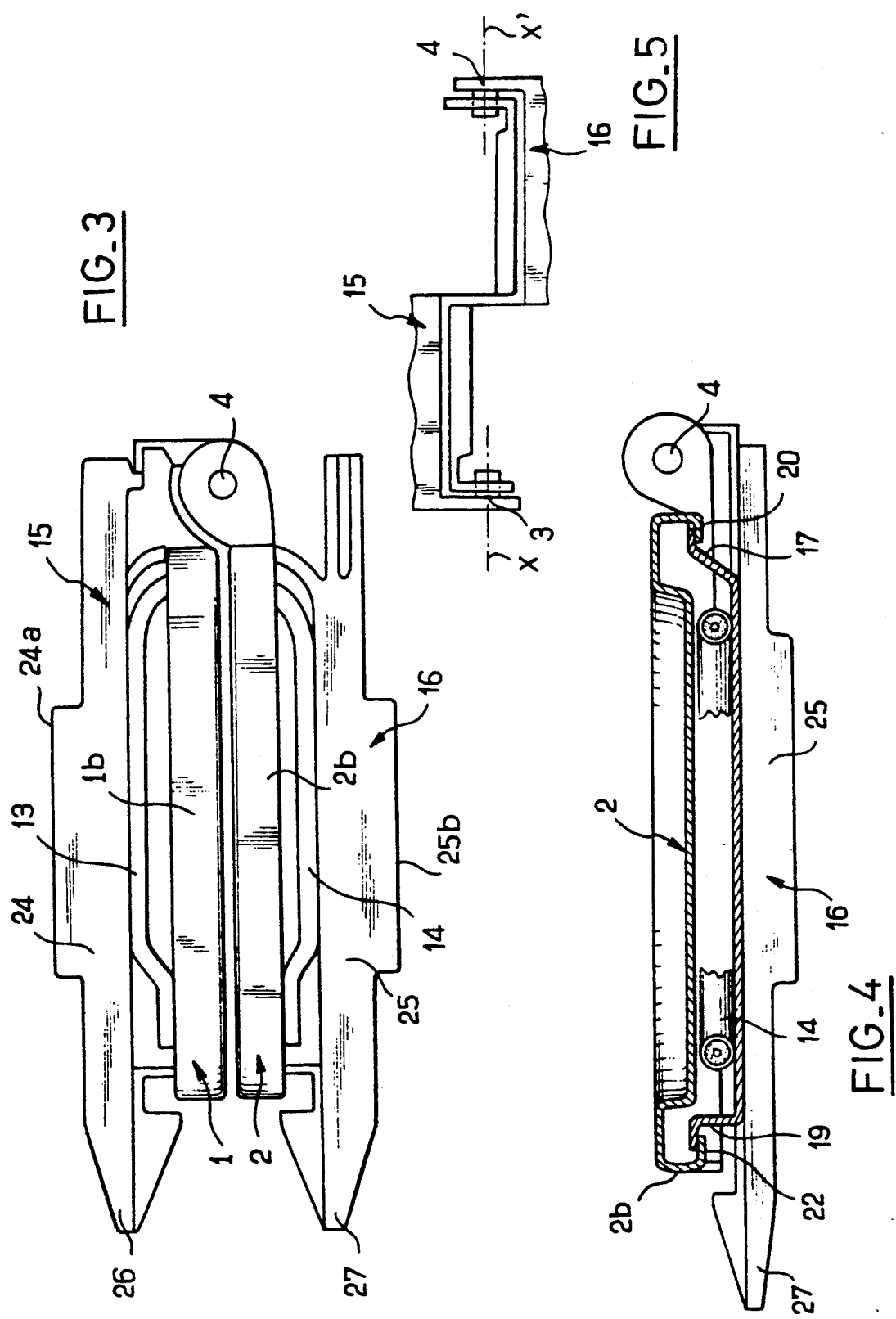

COOKING APPLIANCE WITH HINGED PLATES

BACKGROUND OF THE INVENTION

1. Field of the Invention

The present invention relates to an electric cooking appliance, in particular for toasting food, having two cooking plates hinged together in order to move the plates between a position in which they are located opposite to each other and a position in which they are located in the line of extension of each other for the purpose of mounting and assembly.

The invention applies in particular to the cooking of food preparations such as toasted ham-andcheese sandwiches.

2. Description of the Prior Art

In this type of cooking appliance, each cooking plate carries an insulating casing which covers the face opposite to its cooking face, an electric heating resistor being placed between each plate and its casing.

In the known designs (as disclosed, for example, in patent FR-A-2 302 067), the cooking plates are made sufficiently rigid by molding from cast iron or aluminum and the elements used for joining them together in hinged relation are carried by the plates themselves or by the insulating casings.

The heating resistors are either embedded in the metal of the plates or attached thereto by suitable means.

A reflecting surface of sheet metal, for example, is usually placed between the heating resistor and the casing of insulating material in order to reflect the heat radiation towards the cooking plate and to guard against overheating of the casing.

In the known designs, the reflecting surface may also serve to support the electric heating resistor and the cooking plate (as in patent FR-A-2 302 067). In this case, the reflecting surface rests on a peripheral shoulder of the insulating casing and is provided with an added stiffening reinforcement.

A handle of insulating material is attached to each casing on the side opposite to the hinge elements in order to bring the casings into position one above the other for simultaneous cooking of both faces of a toasted ham-and-cheese sandwich or for transportation of the appliance.

The disadvantage of these cooking appliances is that they are expensive to produce, primarily by reason of the fact that the cooking plates are cast in a foundry. This high cost is increased even further by the many operations involved in assembly of the different elements which go to make up the appliance.

The object of the present invention is to overcome the drawbacks of known designs by creating an appliance with cooking plates which is simple and inexpensive to manufacture.

SUMMARY OF THE INVENTION

The invention is accordingly directed to an electric cooking appliance, in particular for toasting food, having two cooking plates hinged together in order to displace these plates between a position in which they are located opposite to each other for the purpose of cooking and a position in which they are located in the line of extension of each other for the purpose of assembly and two insulating casings in which are placed electric heating resistors.

In accordance with the invention, the cooking appliance is distinguished by the fact that each cooking plate is constructed of die-stamped sheet metal and is attached to a sheet-metal support plate forming a reflector, said support plates being adapted to carry the cooking-plate hinge elements, and that each support plate is provided on the side remote from the hinge elements with two lugs extending beyond the adjacent edge of the cooking plate and used for attaching handles of insulating material, the handles being locked in position by the casings at the time of assembly.

The cooking appliance is particularly economical by virtue of the fact that the cooking plates are formed of die-stamped sheet metal instead of cast iron or cast aluminum.

In order to endow these cooking plates of thin sheet metal with sufficient rigidity, an essential feature of the invention consists in providing a sheet metal support plate for each cooking plate. The support plate forms a reflector and is also adapted to carry the hinge elements as well as the handle-fixing supports which are locked when the casings are placed in position.

In an advantageous embodiment of the invention, the hinge elements of the two cooking plates are formed in one piece with each support plate.

The single-piece construction of these hinge elements permits a considerable reduction in cost of manufacture and assembly.

In a preferred embodiment of the invention, the two support plates are identical and interchangeable.

Low manufacturing costs can also be obtained by virtue of this distinctive feature.

Preferably, each cooking plate of die-stamped sheet metal has a peripheral flange which is bent-back towards the support plate, said support plate being provided on two of its opposite sides with lugs bentback towards the cooking plate, the flange of said cooking plate being provided with zones which are attached by crimping to said bent-back lugs of the support plate.

The cooking and support plates are thus rigidly fixed to each other by means of simple crimping operations which are inexpensive to perform and which endow the assembly with good rigidity in spite of the use of relatively thin sheet-metal parts.

Other features and advantages of the invention will become apparent in the description given below.

BRIEF DESCRIPTION OF THE DRAWINGS

FIG. 3 is a side view of the cooking appliance, the cooking plates being applied against each other, the insulating casings and handles of the appliance having been removed.

FIG. 4 is a view taken along line IV—IV of FIG. 2.

FIG. 5 shows how the two support plates are joined together in hinged relation.

DETAILED DESCRIPTION OF THE INVENTION

Figure 1:
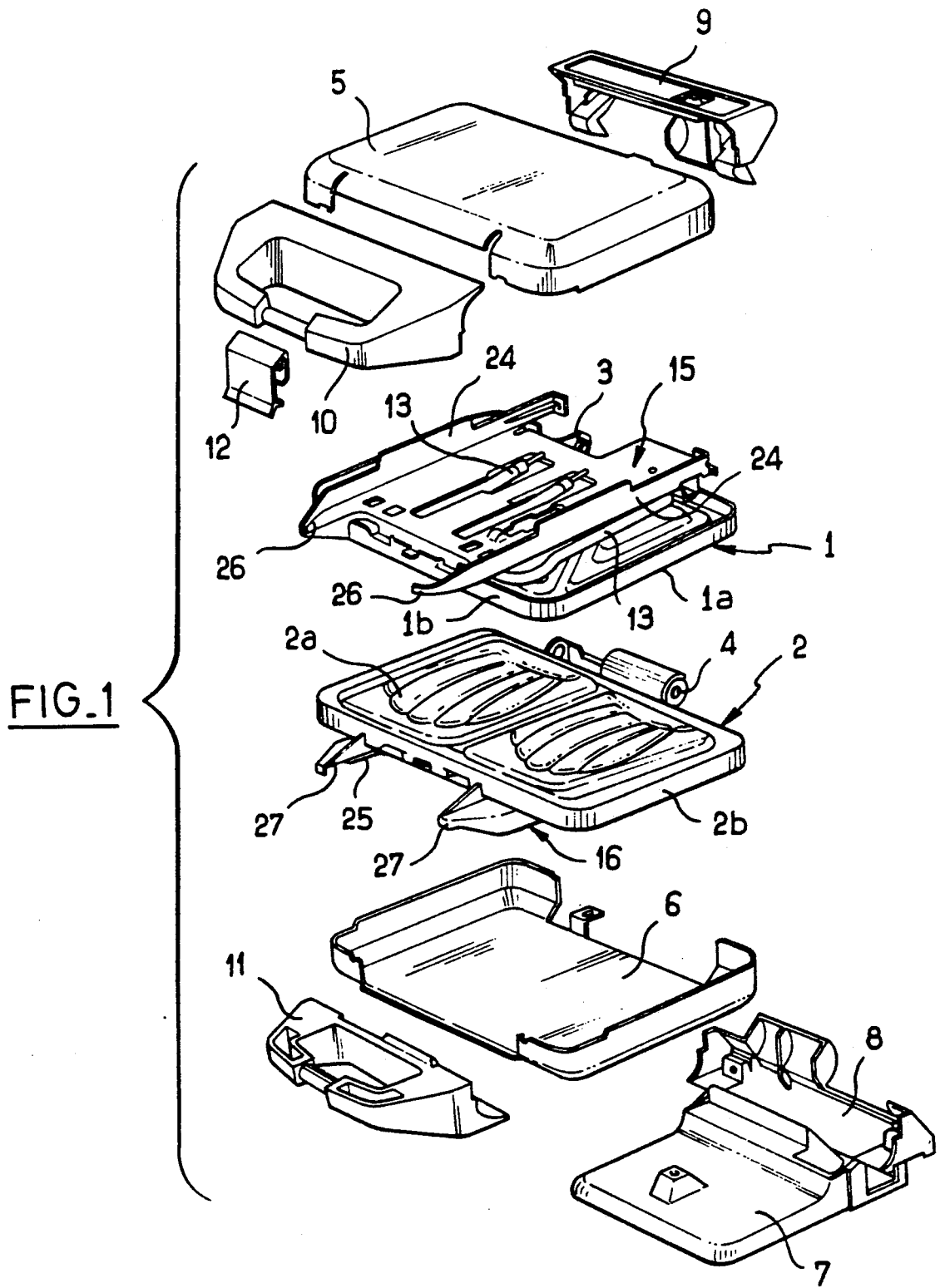
FIG. 1 is an exploded view in perspective showing the cooking appliance in accordance with the invention.

In the embodiment of FIG. 1, the cooking appliance of the type used for toasting ham-and-cheese sandwiches has two cooking plates 1, 2 which can be joined together by means of hinges 3, 4 in order to move them between a position in which the two plates 1, 2 are applied against each other as shown in FIG. 3 and a position (not shown) in which the two plates 1, 2 are located at 180° in the line of extension of each other at the time of assembly. The face of each cooking plate 1, 2 opposite to its cooking face 1a, 2a is intended to be covered by a casing 5, 6 of painted steel or of insulating material.

Provision is made beneath the lower casing 6 for a base 7 which carries a mask 8 in order to conceal the hinges 3, 4. Another mask 9 is provided at the level of the upper casing 5. A handle which is attached to the support plates 15 and 16 corresponds to each casing 5, 6 and serves to displace the plates 1, 2 about the hinges 3, 4. An intermediate part 12 is provided for coupling the handles 10, 11 in the position in which the cooking plates 1, 2 are applied against each other.

Moreover, a tubular electric heating resistor 13, 14 (also shown in FIG. 3) extends between each cooking plate 1, 2 and the corresponding casing.

In accordance with the invention, each cooking plate 1, 2 is made of die-stamped sheet metal and is attached to a sheet-metal support plate 15, 16 forming a reflector. Each heating resistor 13, 14 extends between a support plate 15, 16 and the adjacent cooking plate 1, 2 (as shown in particular in FIG. 3).

Figure 2:
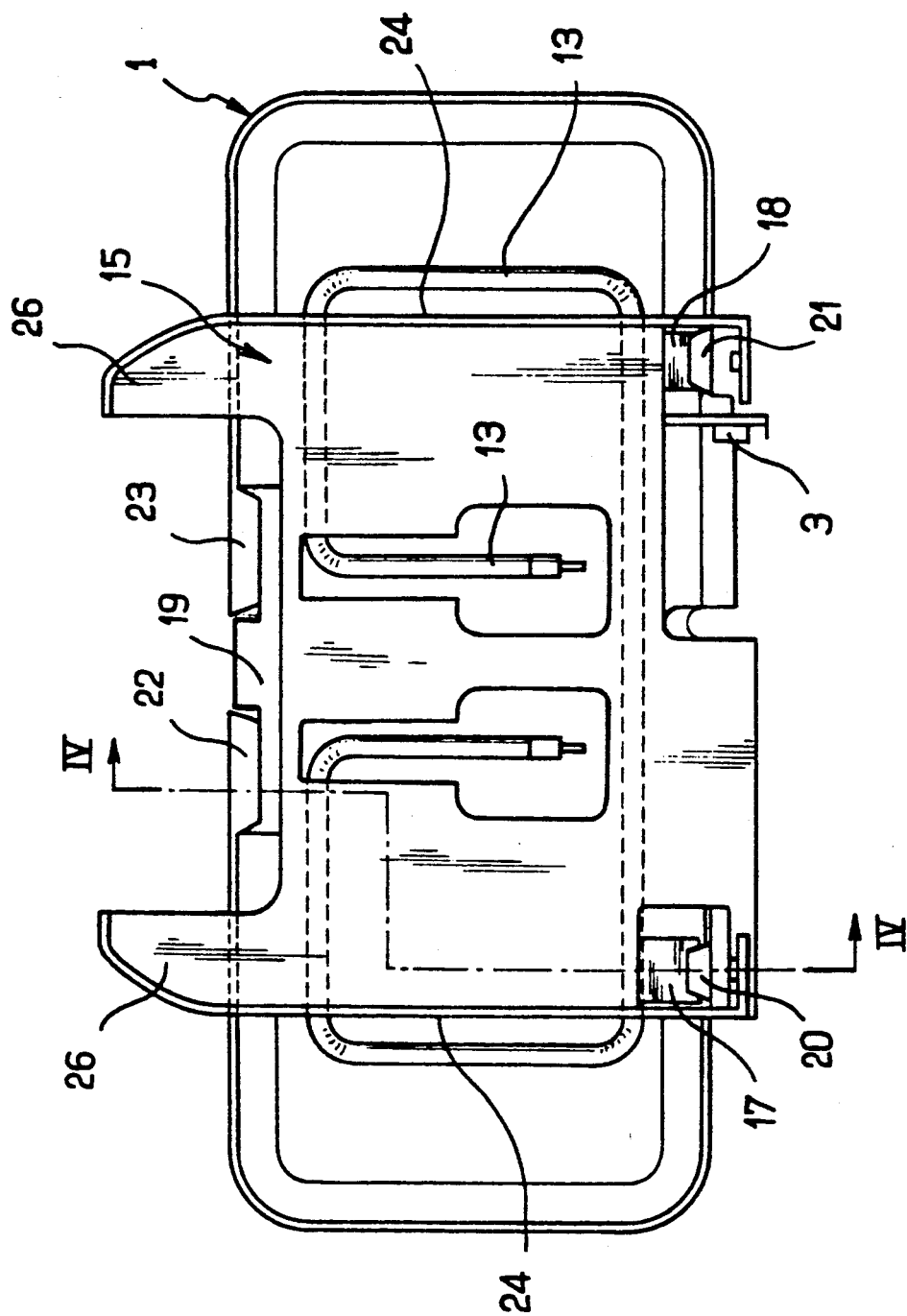
FIG. 2 is a plan view showing the underface of a cooking plate and of a support plate.

It is apparent in particular from FIGS. 2, 3 and 4 that the hinge elements 3, 4 are formed in one piece with each support plate 15, 16 by cutting and die-stamping.

Moreover, these figures also show that each support plate 15, 16 is formed in a single piece and that the two cooking plates 1, 2 are identical and interchangeable.

As shown in FIGS. 1 to 4, each cooking plate 1, 2 of die-stamped sheet metal has a peripheral flange 1b, 2b which is bent-back towards the support plate 15 or 16.

Each support plate 15 or 16 is provided on two of its opposite sides with lugs 17, 18, 19 (see FIGS. 2 and 4) which are bent-back towards the cooking plate 1 or 2.

Moreover, the flange 1b or 2b of the cooking plate 1 or 2 has zones 20, 21, 22, 23 which are attached by crimping to the bent-back lugs 17, 18, 19 of the support plate 15 or 16.

It can also be seen, in particular in FIG. 3, that each tubular heating resistor 13, 14 is sandwiched between the cooking plate 1, 2 and the support plate 15 or 16.

Furthermore (as shown in FIGS. 1 to 4), each support plate 15 or 16 is provided on two of its opposite sides with a flange 24, 25 which is bent outwards at right angles and extends in a direction perpendicular to the axis of articulation X—X' of the plates (see also FIG. 5).

These two flanges 24, 25 endow the support plates 15, 16 with good rigidity. The free edges 24a, 25b of the flanges 24, 25 are intended to be applied against the walls of the casings 5, 6 which are thus permitted to withstand compressive stresses.

Moreover, each support plate 15, 16 is provided on the side opposite to the hinge elements 3, 4 and in the line of extension of the flanges 24, 25 with two projecting lugs 26, 27 which extend beyond the adjacent edge of the cooking plate 1, 2. These lugs 26, 27 are used for attaching handles 10, 11 of insulating material and endow them with rigidity.

In the embodiment described in the foregoing, the cooking plates 1, 2 and the support plates 15, 16 are advantageously formed of thin sheet metal. Each cooking face 1a, 2a of the cooking plates 1, 2 is preferably provided with an anti-adhesive coating of polytetrafluoroethylene or of enamel charged with a dark pigment such as carbon black.

The fact that the cooking plates 1, 2 are of die-stamped sheet metal permits the achievement of significant cost savings and constitutes one of the main advantages of the cooking or toasting appliance described in the foregoing.

This design concept has been made possible by the use of support plates 15, 16 which perform the following functions:

they constitute a rigid support for the sheet-metal cooking plates, they perform the function of reflectors, they integrate the hinges, they integrate the attachment of the handles, they enable the insulating casings to withstand compressive stresses, they hold the heating resistors in position.

By virtue of this plurality of functions, the cooking appliance has a very small number of parts as well as a small number of screwing points, thus facilitating its assembly and considerably reducing its cost of manufacture.

As will be readily apparent, the invention is not limited to the example of construction which has just been described and any number of modifications may accordingly be contemplated without thereby departing either from the scope or the spirit of the invention.

What is claimed is:

1. An electric cooking appliance, in particular for toasting food, having two cooking plates (1, 2) hinged together by means of hinge elements (3, 4) in order to displace said plates between a position in which they are located opposited to each other for the purpose of cooking and a position in which they are located at 180° in the line of extension of each other for the purpose of assembly, each cooking plate (1, 2) having a cooking face (1a, 2a), and being adapted to carry a casing (5, 6) which covers the face opposite to its cooking face, an electric heating resistor (13, 14) being disposed between each plate (1, 2) and its casing (5, 6), wherein each cooking plate (1, 2) is constructed of die-stamped sheet metal and is attached to a sheet-metal support plate (15, 16) forming a reflector, said support plates (15, 16) being adapted to carry the hinge elements (3, 4) of the cooking plates (1, 2) and wherein each support plate (15, 16) is provided on the side remote from the hinge elements (3, 4) with two lugs (26, 27) extending beyond the adjacent edge of the cooking plate (1, 2) and used for attaching handles (10, 11) of insulating material, the handles being locked in position by the casings (5, 6) at the time of assembly.

2. A cooking appliance according to claim 1, wherein said hinge elements (3, 4) are formed in one piece with each support plate (15, 16).

3. A cooking appliance to claim 2, wherein each support plate (15, 16) is formed in one piece without any added part.

4. A cooking appliance according to claim 3, wherein the two support plates (15, 16) are identical and interchangeable.

5. A cooking appliance according to claim 1, wherein each cooking plate (1, 2) of die-stamped sheet metal has a peripheral flange (1b, 2b) which is bentback towards the support plate (15, 16), said support plate being provided on two of its opposite sides with lugs (17, 18, 19) bent-back towards the cooking plate, the flange (1b, 2b) of said cooking plate being provided with zones (20, 21, 22, 23) which are attached by crimping to said bent-back lugs (17, 18, 19) of the support plate.

6. A cooking appliance according to claim 1, wherein the heating resistor (13, 14) is tubular and is sandwiched between the cooking plate (1, 2) and the support plate (15, 16).

7. A cooking appliance according to claim 1, wherein each support plate (15, 16) is provided on two of its opposite sides with an outwardly bent flange (24, 25) which extends in a direction perpendicular to the axis of articulation of the plates.

* * * * *